United States Patent
Park (10) Patent No.: US 7,724,940 B2
(45) Date of Patent: May 25, 2010

(54) METHOD OF ACCURATELY DETERMINING SIMILARITY BETWEEN TARGET IMAGE AND REFERENCE IMAGE

(75) Inventor: Yun-won Park, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 919 days.

(21) Appl. No.: 11/522,867

(22) Filed: Sep. 18, 2006

(65) Prior Publication Data

US 2007/0076945 A1 Apr. 5, 2007

(30) Foreign Application Priority Data

Sep. 30, 2005 (KR) .................. 10-2005-0092159

(51) Int. Cl.
G06K 9/00 (2006.01)
G06K 9/62 (2006.01)
(52) U.S. Cl. ...................... 382/141; 382/209
(58) Field of Classification Search .............. None
See application file for complete search history.

(56) References Cited

U.S. PATENT DOCUMENTS 4,611,348 A * 9/1986 Williams et al. ............ 382/300
6,342,916 B1 * 1/2002 Kashiwagi et al. ........... 348/87
2002/0118349 A1 * 8/2002 Yang et al. .................. 355/55
2004/0066962 A1 * 4/2004 Sasa et al. ................. 382/141

FOREIGN PATENT DOCUMENTS

| JP | 2002-222420 A | 8/2002 |
|----|---------------|--------|
| JP | 2003-256809 A | 9/2003 |

* cited by examiner

Primary Examiner—Matthew C Bella
Assistant Examiner—Alex Liew
(74) Attorney, Agent, or Firm—Drinker Biddle & Reath LLP (57) ABSTRACT

Provided is a method of determining a similarity between a target image and a reference image. The method includes (a) obtaining related approximation pixel-values of the reference image $p_t$ having overall relationship between coordinates (x, y) and original pixel-values $f_t$ of pixels of the reference image; (b) obtaining related approximation pixel-values of the target image $p_s$ having overall relationship between coordinates (x, y) and original pixel-values $f_s$ of pixels of the target image; and (c) determining the similarity using the target related approximation pixel-values $p_s$ and the reference related approximation pixel-values $p_t$.

14 Claims, 6 Drawing Sheets

METHOD OF ACCURATELY DETERMINING SIMILARITY BETWEEN TARGET IMAGE AND REFERENCE IMAGE

BACKGROUND OF THE INVENTION

This application claims the priority of Korean Patent Application No. 10-2005-0092159, filed on Sep. 30, 2005, in the Korean Intellectual Property Office, the disclosure of which is incorporated herein in its entirety by reference.

1. Field of the Invention

The present invention relates to a method of determining a similarity between a target image and a reference image, and more particularly, to a method of determining a similarity between a target image and a reference image using a vision system included in a part mounter.

2. Description of the Related Art

A conventional part recognition method used by a part mounter is disclosed in Japanese Patent Publication No. 2002-222420 (title: Image Recognition Method). In this conventional part recognition method, picked-up parts are recognized using geometrical information such as lead shapes or edge shapes of the picked-up parts.

Another conventional part recognition method is disclosed in Japanese Patent Publication No. 2003-256809 (title: Image Processing Apparatus and Method). In this conventional part recognition method, picked-up parts are recognized using brightness information thereof.

Figure 1:
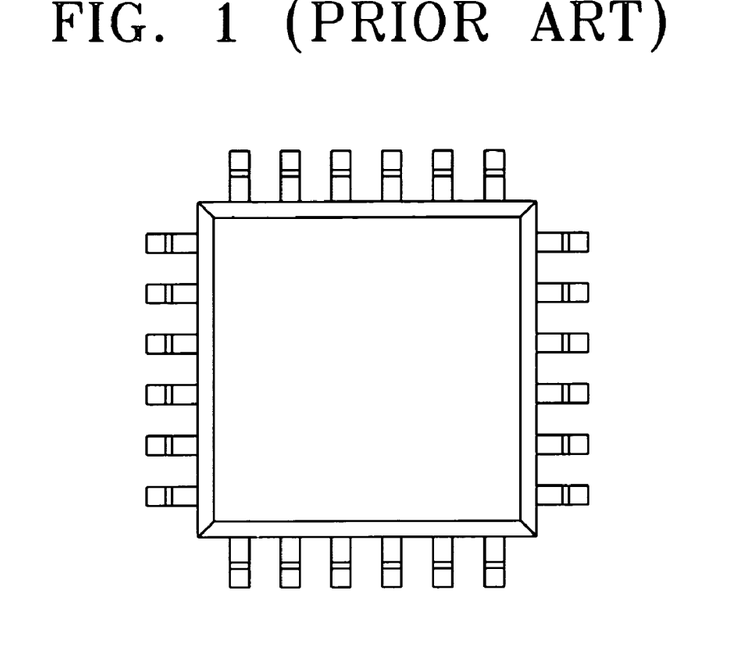
FIG. 1 illustrates parts with characteristic shapes.
Figure 2:
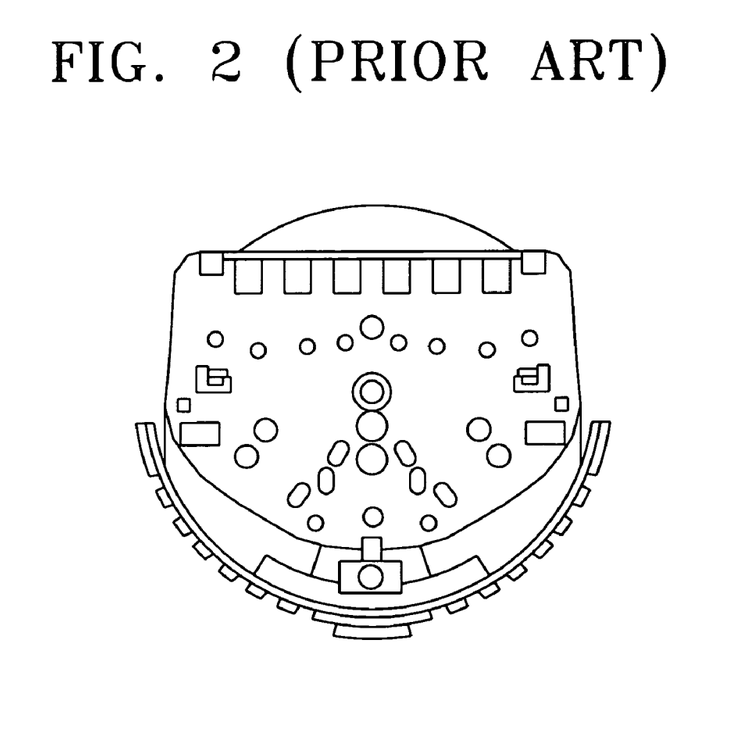
FIG. 2 illustrates parts without characteristic shapes.

According to such conventional part recognition methods, a part mounter can recognize parts with characteristic shapes but cannot recognize parts without characteristic shapes. FIG. 1 illustrates parts with characteristic shapes. FIG. 2 illustrates parts without characteristic shapes.

To recognize the parts without characteristic shapes as illustrated in FIG. 2, reference images, which are which are images of portions of reference parts of each type, are stored. Then, whether an image of a picked-up part includes a reference image is determined. In so doing, the type of the picked-up part can be determined.

In other words, it is required to determine a similarity between a target image, which is an image of part of a picked-up image, and a reference image. Therefore, a method of accurately determining a similarity between a target image and a reference image, even though the original pixel-values of pixels of the target image minutely vary according to photographing and image-processing conditions, is required.

SUMMARY OF THE INVENTION

The present invention provides a method of accurately determining a similarity between a target image and a reference image even though original pixel-values of pixels of the target image minutely vary according to photographing and image-processing conditions. Therefore, parts without characteristic shapes can be accurately recognized.

In another embodiment of the present invention, there is provided a method of determining a similarity between a target image and a reference image, the method including: (a) obtaining related approximation pixel-values of the reference image having overall relationship between coordinates and original pixel-values $f_r$ of pixels of the reference image; (b) obtaining target related approximation pixel-values having overall relationship between coordinates and original pixel-values of pixels of the target image; and (c) determining the similarity using the target related approximation pixel-values and the reference related approximation pixel-values.

As used herein, the term "original pixel-value" means a brightness value that is sensed from a pixel, and the term "related approximation pixel-value" means a value of a pixel that has relationship between coordinates (x,y) of the pixel and the "original pixel-value."

In a similarity determination method according to the present invention, a similarity between a target image and a reference image is determined using target related approximation pixel-values $p_s$, which have overall relationship, of the target image and the reference related approximation pixel-values $p_r$, which have overall relationship, of the reference image. Accordingly, although the original pixel-values $f_s$ of pixels of the target image minutely vary according to photographing and image-processing conditions, the similarity between the target image and the reference image can be accurately determined. Consequently, parts without characteristic shapes can be accurately recognized.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 3:
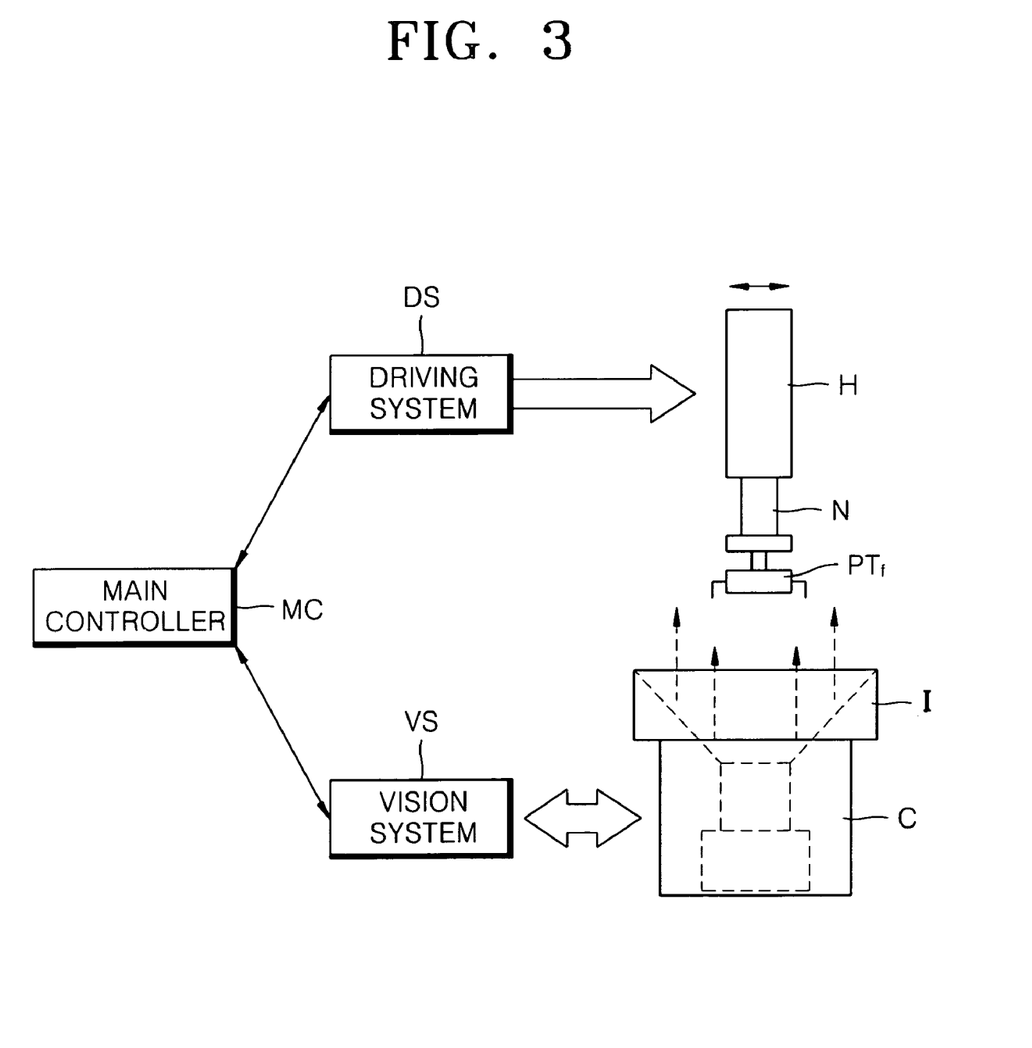
FIG. 3 is a block diagram of a part mounter using a similarity determination method according to an embodiment of the present invention.

FIG. 3 is a block diagram of a part mounter using a similarity determination method according to an embodiment of the present invention. Referring to FIG. 3, the part mounter includes a driving system DS, a line scan camera C, a vision system VS, and a main controller MC.

When in operation, the driving system DS drives a part-mounting head H. The line scan camera C takes a photograph of a target part P being moved, for example, an integrated circuit device absorbed to a nozzle of the part-mounting head H. The vision system VS processes image data received from the line scan camera C and generates position information of a target part $PT_f$. In this case, the vision system VS first determines the type of the target part $PT_f$ using the similarity determination method according to an embodiment of the present invention, which will be described later with reference to FIGS. 4 through 6.

The main controller MC controls the driving system DS based on position information received from the vision system VS. The nozzle N is adhered to the part-mounting head H of the part mounter. The target part $PT_f$, for example, an integrated circuit device, is mounted on the nozzle N due to a pressure change within the nozzle N. Here, the line scan camera C is located on a common path of the part-mounting head H. The line scan camera C takes a photograph of the target part $PT_f$ absorbed to the nozzle N and outputs data. In other words, as the target part $PT_f$ passes the line scan camera C, the line scan camera C captures and outputs image data of continuous lines. The image data output from the line scan camera C is provided to the vision system VS included in the part mounter, and an image frame is captured within the vision system VS. Here, an illuminator I coupled to the line scan camera C may include a plurality of light sources, for example, three light emitting diodes, arranged to provide uniform intensity of illumination to all imaging regions of the line scan camera C.

Figure 4:
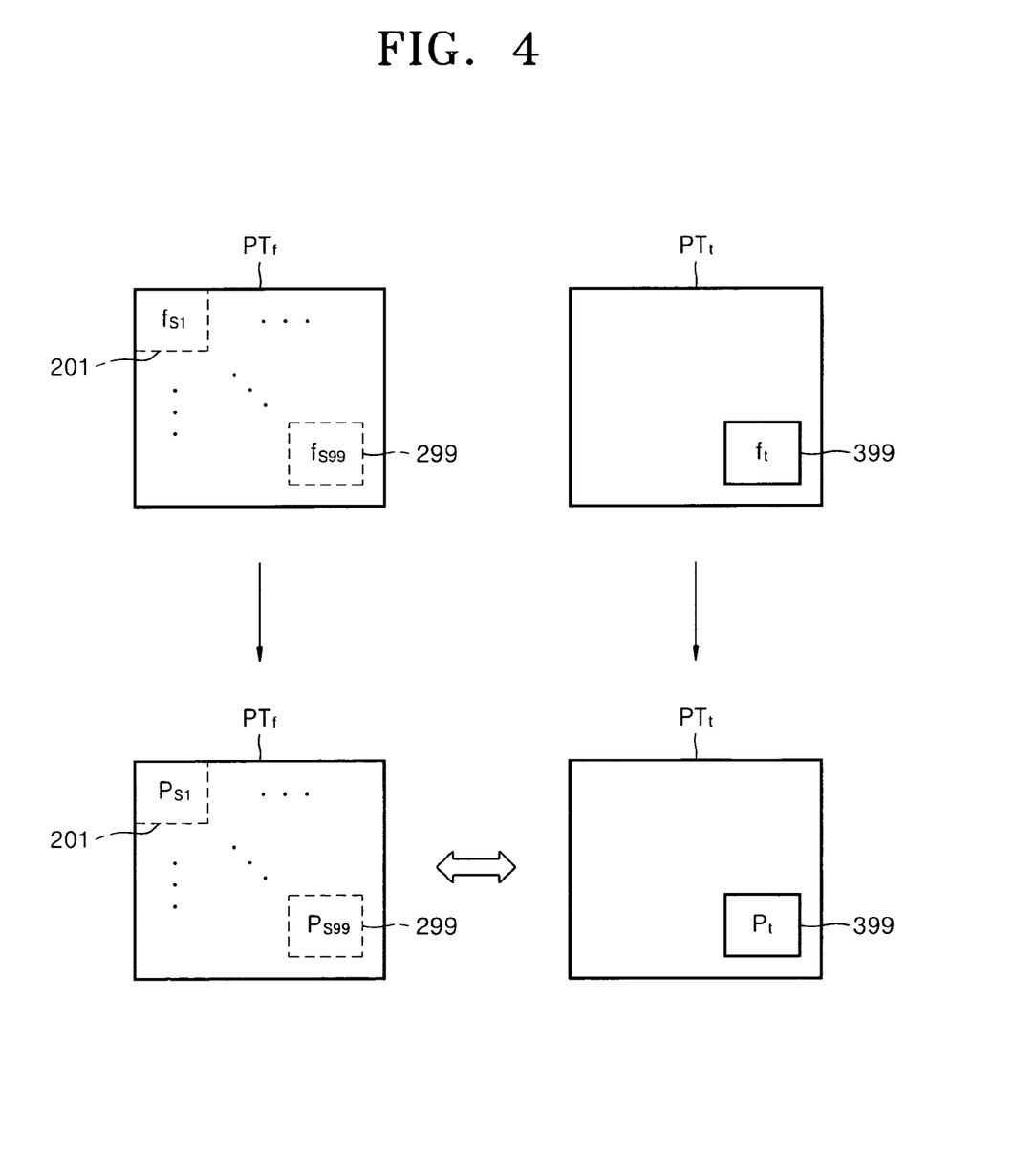
FIG. 4 is a diagram for explaining a similarity determination method according to an embodiment of the present invention.
Figure 5:
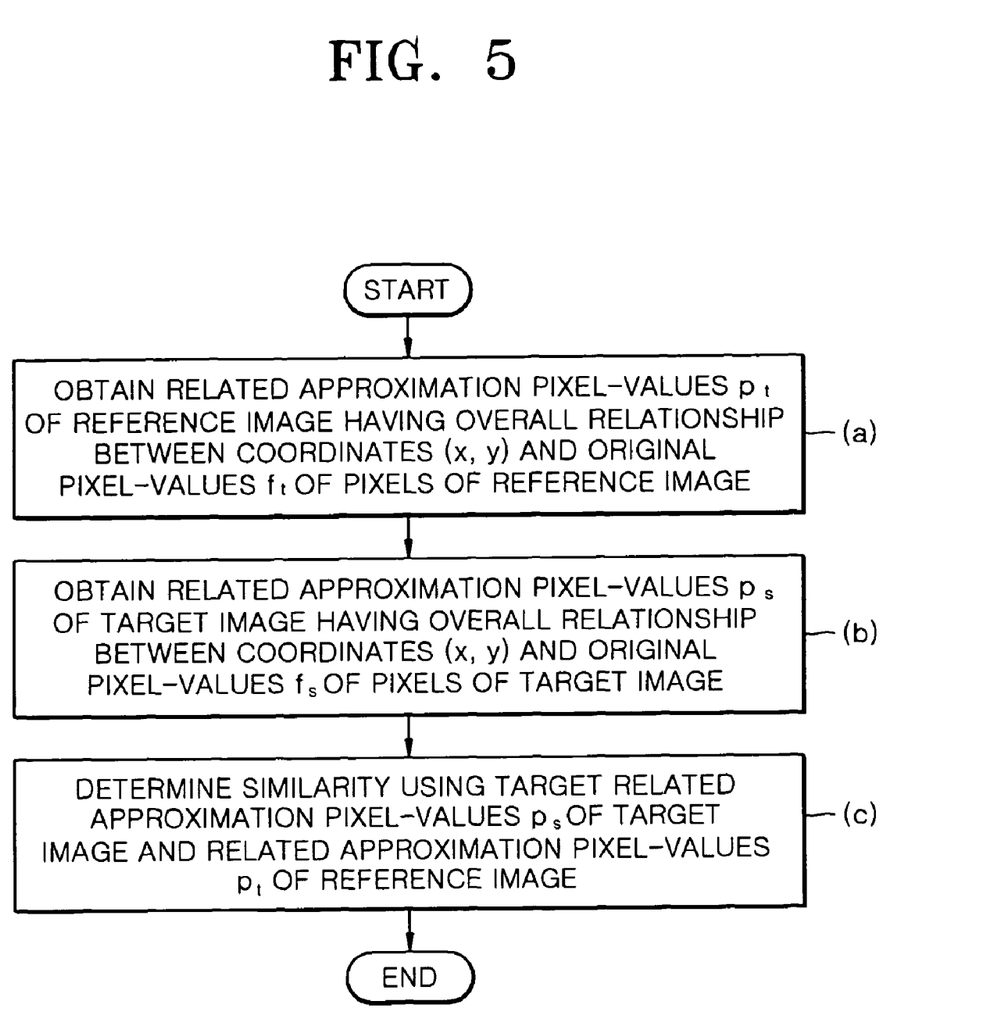
FIG. 5 is a flowchart illustrating the similarity determination method of FIG. 4.
Figure 6:
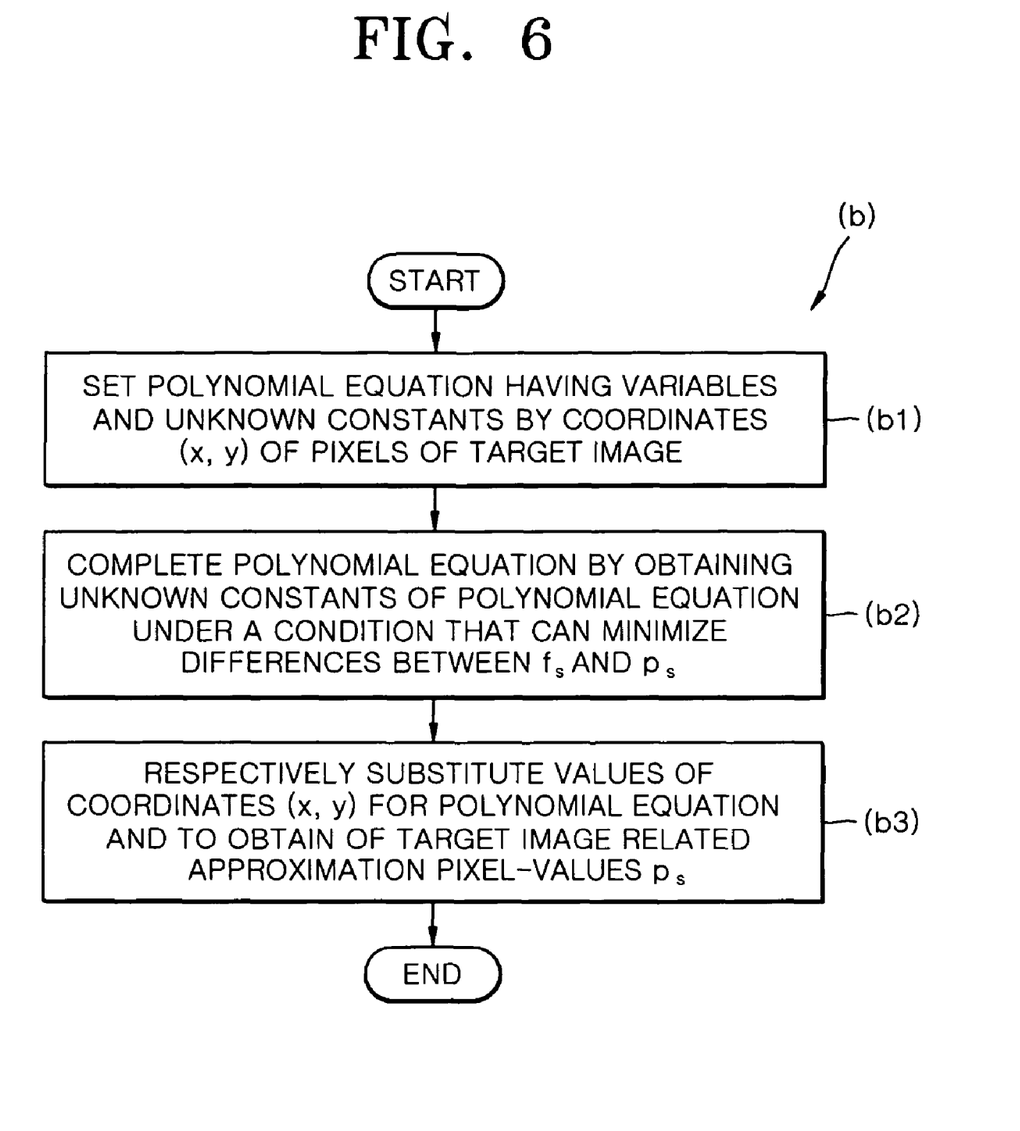
FIG. 6 is a detailed flowchart illustrating one way of obtaining target related approximation pixel-values in the method illustrated in FIG. 5.

FIG. 4 is a diagram for explaining a similarity determination method according to an embodiment of the present invention. FIG. 5 is a flowchart illustrating the similarity determination method of FIG. 4. FIG. 6 is a detailed flowchart illustrating operation (b) of FIG. 5.

As described above, to recognize a target part $PT_f$ without a characteristic shape, it is required to store a reference image 399, which is an image of a portion of a reference part $PT_r$, and an image of the picked-up target part $PT_f$ is analyzed to determine whether it includes the reference image 399. In this case, a plurality of target images 201 through 299 that are of equal size compared to that of the reference image 399 exist in the image of the target part $PT_f$. Referring to FIG. 4, as a result of sequentially comparing the target images 201 through 299 with the reference image 399, the target image 299 is determined to be identical to the reference image 399. A method of determining a similarity between any one of the target images 201 through 299 and the reference image 399 will now be described with reference to FIGS. 4 through 6.

In operation (a), related approximation pixel-values of the reference image 399 $p_t$ having overall relationship between coordinates (x, y) and original pixel-values $f_t$ of pixels of the reference image 399 are obtained.

In operation (b), target related approximation pixel-values $p_s$ having overall relationship between coordinates (x, y) and original pixel-values $f_s$ of pixels of a target image (any one of the target images 201 through 299) are obtained. An algorithm for performing operation (a) on the reference image 399 is identical to an algorithm for performing operation (b) on the target image (any one of the target images 201 through 299). Hence, only the algorithm for performing operation (b) will now be described.

A polynomial equation having variables and unknown constants corresponding to coordinates (x, y) of pixels of a target image (any one of the target images 201 through 299 is set (operation b1). More specifically, the unknown constants are $a_{10}$, $a_{01}$, $a_{20}$ and $a_{02}$, and a quadratic polynomial equation thereof is set by Equation 1.

$$p_s = a_{00} + a_{10}x + a_{01}y + a_{20}x^2 + a_{11}xy + a_{02}y^2, \qquad (1)$$

where $p_s$ indicates target related approximation pixel-values which will be obtained as a result of Equation 1.

The unknown constants of the quadratic polynomial equation may be expressed as a matrix $A_s$ as given by Equation 2

$$A_s = \begin{bmatrix} a_{00} \\ a_{10} \\ a_{01} \\ a_{20} \\ a_{11} \\ a_{02} \end{bmatrix}. \qquad (2)$$

In addition, coordinate variables of the quadratic polynomial equation can be expressed as a coordinate matrix X as given by Equation 3

$$X = \begin{bmatrix} 1 \\ x \\ y \\ x^2 \\ xy \\ y^2 \end{bmatrix}. \qquad (3)$$

Therefore, assuming that a transposed matrix of the matrix $A_s$ is $A_s'$, the quadratic polynomial equation of Equation 1 may be converted into a determinant as given by Equation 4

$$p_s = A_s' X \qquad (4).$$

The unknown constants $A_s$ of the polynomial equation are obtained under a condition that can minimize the differences between the original pixel-values $f_s$ of the pixels of the target image (any one of the target images 201 through 299) and the target related approximation pixel-values $p_s$ to be obtained as a result of Equation 4, thereby completing the polynomial equation (operation b2).

More specifically, a value $Xf_s$ is obtained for each of the pixels of the target image by multiplying the coordinate matrix X of Equation 3 by the original pixel-values $f_s$. In this case, a sum $\Sigma Xf_s$ of the values $Xf_s$ is a sensed concentrative moment $U_{sf}$ of the target image, which satisfies Equation 5.

$$U_{sf} = \Sigma Xf_s \qquad (5).$$

Next, the unknown constants $A_s$ of the quadratic polynomial equation are obtained under a condition that can minimize a sum $E_s$ of squares $(p_s - f_s)^2$ of the differences between the original pixel-values $f_s$ of the pixels of the target image and the target related approximation pixel-values $p_s$ to be obtained as a result of Equation 4.

Here, a deviation $E_s$, which is a sum of the squares $(p_s - f_s)^2$, may be defined by Equation 6

$$E_s = \sum (p_s - f_s)^2. \qquad (6)$$

When Equation 4 is substituted for Equation 6, Equation 7 can be obtained.

$$E_s = \sum (A_s' X - f_s)^2. \qquad (7)$$

A sum-matrix $$\sum XX',$$

which is a sum of the result of multiplying the coordinate matrix X of the Equation 3 with a transposed matrix X' of the matrix X, may be defined by Equation 8

$$\sum XX' = \begin{bmatrix} 1 & x & y & x^2 & xy & y^2 \\ x & x^2 & xy & x^3 & x^2y & xy^2 \\ y & xy & y^2 & x^2y & xy^2 & y^3 \\ x^2 & x^3 & x^2y & x^4 & x^3y & x^2y^2 \\ xy & x^2y & xy^2 & x^3y & x^2y^2 & xy^3 \\ y^2 & xy^2 & y^3 & x^2y^2 & xy^3 & y^4 \end{bmatrix}. \quad (8)$$

When Equations 5 and 8 are substituted for Equation 7, Equation 7 is converted into Equation 9.

$$E_s = A'_s \left( \sum XX' \right) A_s - 2A'_s U_{sf} + f_s^2. \quad (9)$$

Assuming that the coordinate-multiplication matrix XX' is replaced with B, Equation 9 is converted into Equation 10.

$$E_s = A'_s B A_s - 2A'_s U_{sf} + \sum f_s^2. \quad (10)$$

Therefore, an equation, which can minimize the differences $E_s$ between the original pixel-values $f_s$ of the pixels of the target image (any one of the target images 201 through 299) and the target related approximation pixel-values $p_s$ obtained as a result of Equation 4, is Equation 11.

$$\frac{\partial E_s}{\partial A_s} = 0. \quad (11)$$

When Equation 11 is solved assuming that an inverse matrix of the coordinate-multiplication coordinate B is $B^{-1}$, the unknown constants $A_s$ of the polynomial equation are calculated using $$A_s = B^{-1} U_{sf} \quad (12).$$

Therefore, when Equation 12 is substituted for Equation 4, Equation 13 used to calculate the target related approximation pixel-values $p_s$ is obtained.

$$p_s = U'_{sf} B^{-1} X \quad (13)$$

where $U'_{sf}$ indicates a transposed matrix of the perceived concentrative moment $U_{sf}$.

Then, values of the coordinates (x, y) are respectively substituted for the complete polynomial equation of Equation 13 to obtain the target related approximation pixel-values $p_s$ (operation b3).

As described above, Equation 13 used to obtain the target related approximation pixel-values $p_s$ can also be used to obtain the reference related approximation pixel-values $p_r$ of the reference image 399. In other words, the reference related approximation pixel-values $p_r$ which has overall relationship, of the reference image 399 can be calculated using $$p_r = U'_{tf} B^{-1} X \quad (14)$$

where $U'_{tf}$ indicates a transposed matrix of the perceived concentrative moment $U_{tf}$ of the reference image 399.

Next, in operation (c), a similarity is determined using the target related approximation pixel-values $p_s$ and the reference related approximation pixel-values $p_r$. In other words, the similarity is determined using the reference related approximation pixel-values $p_s$, which have overall relationship, of the target image and the reference related approximation pixel-values $p_r$, which have overall relationship, of the reference image 399. Accordingly, although the original pixel-values $f_s$ of the pixels of the target image minutely vary according to photographing and image-processing conditions, the similarity between the target image and the reference image 399 can be accurately determined. Consequently, parts without characteristic shapes can be accurately recognized.

A conventional image similarity equation is defined by Equation 15

$$h_f = \frac{\sum_{x,y} f_s(x,y) f_t(x,y)}{\sqrt{\sum_{x,y} f_s^2(x,y)}} \quad (15)$$

where $h_f$ indicates a similarity between a target image and a reference image, $f_s$ indicates the original pixel-values of the target image, and $f_t$ indicates the original pixel-values of the reference image.

To apply Equation 15 to the present invention, the original pixel-values $f_s$ of the target image are replaced with the related approximation pixel-values $p_s$ of the target image and the original pixel-values $f_t$ of the reference image 399 are replaced with the related approximation pixel-values $p_t$ of the reference image 399 $p_t$. Then, the similarity $h_p$ between the target image (any one of the target images 201 through 299) and the reference image 399 can be obtained using $$h_p = \frac{\sum_{x,y} p_s(x,y) p_t(x,y)}{\sqrt{\sum_{x,y} p_s^2(x,y)}}. \quad (16)$$

A process of simplifying Equation 16 into a determinant will be described below. When Equation 16 is transformed as sum-matrix symbols, Equation 17 can be obtained.

$$h_p = \frac{\sum p_s p_t}{\sqrt{\sum p_s^2}} \quad (17)$$

When Equation 13 is substituted for Equation 17, Equation 18 below can be obtained.

$$h_p = \frac{\sum U'_{sp} B^{-1} X p_t}{\sqrt{\sum p_s^2}} \quad (18)$$

where $U'_{sp}$ indicates a transposed matrix of a connection concentrative moment $U_{sp}$ of the target image. In this case, Equation 18 is identical to $$h_p = \frac{U'_{sp} B^{-1} \sum X p_t}{\sqrt{\sum p_s^2}}. \tag{19}$$

It can be understood from Equation 5 that $$\sum X p_t$$

in Equation 19 is a connection concentrative moment $U_{tp}$ of the reference image 399. In other words, Equation 19 is identical to $$h_p = \frac{U'_{sp} B^{-1} U_{tp}}{\sqrt{\sum p_s^2}} \tag{20}$$

When the sensed concentrative moment $U_{sf}$ of the target image is replaced with the connection concentrative moment $U_{sp}$ of the target image in Equation 13, the target related approximation pixel-values $p_s$ is given by Equation 20

$$p_s = U'_{sp} B^{-1} X \tag{21}$$

When Equation 21 is substituted for Equation 20, Equation 22 can be obtained.

$$h_p = \frac{U'_{sp} B^{-1} U_{tp}}{\sqrt{\sum (U'_{sp} B^{-1} X)^2}}. \tag{22}$$

Also, Equation 22 is identical to Equation 23

$$h_p = \frac{U'_{sp} B^{-1} U_{tp}}{\sqrt{(\sum U'_{sp} B^{-1} X)(\sum X' B^{-1} U'_{sp})}}. \tag{23}$$

Equation 23 is identical to Equation 24

$$h_p = \frac{U'_{sp} B^{-1} U_{tp}}{\sqrt{\sum U'_{sp} B^{-1} X X' B^{-1} U'_{sp}}}. \tag{24}$$

Equation 24 is identical to Equation 25

$$h_p = \frac{U'_{sp} B^{-1} U_{tp}}{\sqrt{U'_{sp} B^{-1} (\sum X X') B^{-1} U'_{sp}}}. \tag{25}$$

Since the coordinate-multiplication matrix $XX'$ is B, Equation 25 is identical to Equation 26

$$h_p = \frac{U'_{sp} B^{-1} U_{tp}}{\sqrt{(U'_{sp} B^{-1} B B^{-1} U'_{sp})}}. \tag{26}$$

In conclusion, in operation (c), assuming that a transposed matrix of the connection concentrative moment $U_{sp}$ of the target image is $U'_{sp}$ and a connection concentrative moment of the target image is $U_{tp}$, the similarity $h_p$ is given by Equation 27

$$h_p = \frac{U'_{sp} B^{-1} U_{tp}}{\sqrt{U'_{sp} B^{-1} U_{sp}}}. \tag{27}$$

Figure 7:
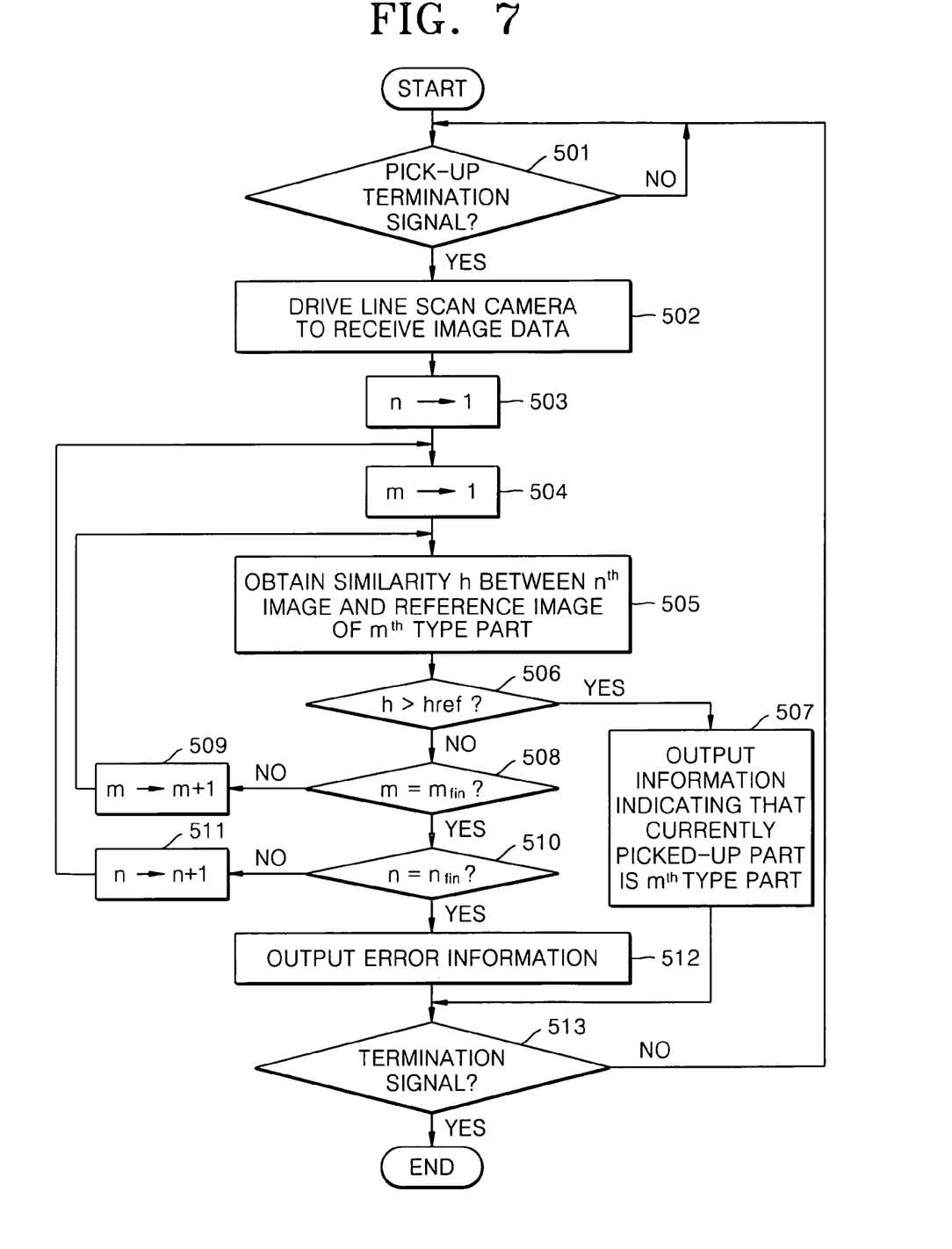
FIG. 7 is a flowchart illustrating an example in which a vision system of the part mounter of FIG. 3 uses the similarity determination method illustrated in FIG. 4.

FIG. 7 is a flowchart illustrating an example in which the vision system of the part mounter of FIG. 3 uses the similarity determination method illustrated in FIGS. 4-6. A method of determining the type of a picked-up part $PT_f$ using the vision system VS will now be described with reference to FIGS. 3, 4 and 7.

When the main controller MC generates a pick-up termination signal (operation 501), the vision system VS drives the line scan camera C and thus receives image data of the part $PT_f$ from the line scan camera C (operation 502).

Next, the vision system VS sets a number n of a target image, which will be sequentially applied, in the received image to "1" (operation 503).

Then, the vision system VS sets a number m of preset part type to "1" (operation 504).

The vision system VS calculates a similarity h ($h_p$ in Equation 27, hereinafter indicated by h) between an $n^{th}$ target image and a reference image of an $m^{th}$ type part using Equation 27 (operation 505).

If the calculation result shows that the similarity h is greater than a reference similarity href (operation 506), the vision system VS outputs information indicating that the currently picked-up part is the $m^{th}$ type part (operation 507).

Conversely, if the calculation result shows that the similarity h is less than the reference similarity href (operation 506), the vision system VS performs the following operations.

If the current part type number m is not a final part type number $m^{fin}$ (operation 508), the vision system VS increases the number m of the current part type by one (operation 509) and performs operation 505 and its subsequent operations.

If the current part type number m is the final part type number $m_{fin}$ (operation 508), the current target image does not correspond to any part type. Therefore, the vision system determines whether the current target image number n is a final target image number $n_{fin}$ (operation 510).

If the vision system VS determines in operation 510 that the current target image number n is not the final target image number $n_{fin}$, it increases the current target image number n by one (operation 511) and performs operation 504 and its subsequent operations.

If the vision system VS determines in operation 510 that the current target image number n is the final target image number $n_{fin}$, it means the currently picked-up part $PT_f$ does not correspond to any part type. Therefore, the vision system VS outputs related error information (operation 512).

The above operations are repeated until an external termination signal is generated (operation 513).

As described above, in a similarity determination method according to the present invention, a similarity between a target image and a reference image is determined using target related approximation pixel-values $p_s$, which have overall relationship, of the target image and the reference related approximation pixel-values $p_t$, which have overall relationship, of the reference image. Accordingly, although the original pixel-values $f_s$ of pixels of the target image minutely vary according to photographing and image-processing conditions, the similarity between the target image and the reference image can be accurately determined. Consequently, parts without characteristic shapes can be accurately recognized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of determining a similarity between a target image and a reference image using a vision system included in a part mounter, the method comprising:

(a) obtaining related approximation pixel-values of the reference image, wherein the related approximation pixel-values have an overall relationship between coordinates and original pixel-values $f_t$ of pixels of the reference image;

(b) obtaining target related approximation pixel-values having overall relationship between coordinates and original pixel-values of pixels of the target image; and (c) determining the similarity using the target related approximation pixel-values and the reference related approximation pixel-values, wherein operation (b) comprises:

(b1) setting a polynomial equation having variables and unknown constants corresponding to the coordinates (x, y) of the pixels of the target image;

(b2) completing the polynomial equation by obtaining the unknown constants of the polynomial equation under a condition that can minimize differences between the original pixel-values $f_s$ of the pixels of the target image and target related approximation pixel-values $p_s$ to be obtained as a result of the polynomial equation; and (b3) obtaining the target related approximation pixel-values $p_s$ by respectively substituting values of the coordinates (x, y) for the polynomial equation completed in operation (b2).

2. The method of claim 1, wherein algorithms for performing operations (a) and (b) are identical.

3. The method of claim 2, wherein, in operation (b1), the unknown constants are $a_{10}$, $a_{01}$, $a_{20}$ and $a_{02}$, and a quadratic polynomial equation $$p_s = a_{00} + a_{10}x + a_{01}y + a_{20}x^2 + a_{11}xy + a_{02}y^2$$

is set.

4. The method of claim 3, wherein, in operation (b1), assuming that a matrix $A_s$ of the unknown constants of the quadratic polynomial equation is $$A_s = \begin{bmatrix} a_{00} \\ a_{10} \\ a_{01} \\ a_{20} \\ a_{11} \\ a_{02} \end{bmatrix},$$

a transposed matrix of the matrix $A_s$ is $A_s'$, and a coordinate matrix X is $$X = \begin{bmatrix} 1 \\ x \\ y \\ x^2 \\ xy \\ y^2 \end{bmatrix},$$

the quadratic polynomial equation is converted into a determinant by $p_s = A_s'X$.

5. The method of claim 4, wherein, in operation (b2), the unknown constants $A_s$ of the quadratic polynomial equation are obtained under a condition that can minimize a sum $E_s$ of squares $(p_s - f_s)^2$ of the differences between the original pixel-values $f_s$ of the pixels of the target image and the target related approximation pixel-values $p_s$ obtained as a result of $p_s = A_s'X$.

6. The method of claim 5, wherein, in operation (b2), assuming that a value $Xf_s$ is obtained for each of the pixels of the target image by multiplying the coordinate matrix X by the original pixel-values $f_s$, that a sum $\Sigma Xf_s$ of the values $Xf_s$ is a sensed concentrative moment $U_{sf}$ of the target image, that a coordinate-multiplication matrix obtained after the coordinate matrix X is multiplied by a transposed matrix X' is XX', and that an inverse matrix of the coordinate-multiplication coordinate XX' is $B^{-1}$, the unknown constants $A_s$ of the polynomial equation are calculated using $A_s = B^{-1}U_{sf}$.

7. The method of claim 6, wherein, in operation (c), assuming that a transposed matrix of a connection concentrative moment $U_{sp}$ of the target image is $U'_{sp}$ and that a connection concentrative moment of the target image is $U_{tp}$, the similarity $h_p$ is given by $$h_p = \frac{U'_{sp}B^{-1}U_{tp}}{\sqrt{U'_{sp}B^{-1}U_{sp}}}.$$

8. A method of determining a similarity between a target image, which is an image of portion of a picked up part, and a reference image using a vision system included in a part mounter, the method comprising:

(a) obtaining related approximation pixel-values of the reference image having overall relationship between coordinates and original pixel-values of pixels of the reference image;

(b) obtaining target related approximation pixel-values having overall relationship between coordinates and perceived luminacnes of pixels of the target image; and (c) determining the similarity using the target related approximation pixel-values and the reference related approximation pixel-values.

9. A part mounter, the part mounter comprising:
a part-mounting head;
a nozzle coupled to the part-mounting head;
a camera arranged across from the nozzle;
a vision system coupled to the camera;
a main controller coupled to a driving system and the vision system, wherein the main controller controls the driving system based upon position information received from the vision system; and wherein the vision system photographs a target part, thereby obtaining a target image, and determines a target part type by:
(a) obtaining reference related approximation pixel-values of a reference image having an overall connection between coordinates and original pixel values of the reference image;
(b) obtaining target related approximation pixel-values having overall connection between coordinates and original pixel values of pixels of the target image; and
(c) determining a similarity between the target image and the reference image using the target related approximation pixel values and the original pixel values,
wherein operation (b) comprises:
(b1) setting a polynomial equation having variables and unknown constants corresponding to the coordinates (x, y) of the pixels of the target image;
(b2) completing the polynomial equation by obtaining the unknown constants of the polynomial equation under a condition that can minimize differences between the original pixel-values $f_s$ of the pixels of the target image and target related approximation pixel-values $p_s$ to be obtained as a result of the polynomial equation; and
(b3) obtaining the target related approximation pixel-values $p_s$ by respectively substituting values of the coordinates (x, y) for the polynomial equation completed in operation (b2).

10. The part mounter of claim 9, further comprising an illuminator coupled to the camera, wherein the illuminator comprises a plurality of light sources.

11. A method of determining a similarity between a target image and a reference image using a vision system included in a part mounter, the method comprising:
(a) obtaining related approximation pixel-values of the reference image, wherein the related approximation pixel-values have an overall relationship between coordinates and original pixel-values $f_t$ of pixels of the reference image;
(b) obtaining target related approximation pixel-values having overall relationship between coordinates and original pixel-values of pixels of the target image; and
(c) determining the similarity using the target related approximation pixel-values and the reference related approximation pixel-values;
wherein:
algorithms for performing operations (a) and (b) are identical;
operation (b) comprises:
(b1) setting a polynomial equation having variables and unknown constants corresponding to the coordinates (x, y) of the pixels of the target image;
(b2) completing the polynomial equation by obtaining the unknown constants of the polynomial equation under a condition that can minimize differences between the original pixel-values $f_s$ of the pixels of the target image and target related approximation pixel-values $p_s$ to be obtained as a result of the polynomial equation; and
(b3) obtaining the target related approximation pixel-values $p_s$ by respectively substituting values of the coordinates (x, y) for the polynomial equation completed in operation (b2);
in operation (b1), the unknown constants are $a_{10}$, $a_{01}$, $a_{20}$ and $a_{02}$, and a quadratic polynomial equation $$p_s = a_{00} + a_{10}x + a_{01}y + a_{20}x^2 + a_{11}xy + a_{02}y^2$$

is set; and
in operation (b1), assuming that a matrix $A_s$ of the unknown constants of the quadratic polynomial equation is $$A_s = \begin{bmatrix} a_{00} \\ a_{10} \\ a_{01} \\ a_{20} \\ a_{11} \\ a_{02} \end{bmatrix},$$

a transposed matrix of the matrix $A_s$ is $A_s'$, and a coordinate matrix X is $$X = \begin{bmatrix} 1 \\ x \\ y \\ x^2 \\ xy \\ y^2 \end{bmatrix},$$

the quadratic polynomial equation is converted into a determinant by $p_s = A_s'X$.

12. The method of claim 11, wherein, in operation (b2), the unknown constants $A_s$ of the quadratic polynomial equation are obtained under a condition that can minimize a sum $E_s$ of squares $(p_s - f_s)^2$ of the differences between the original pixel-values $f_s$ of the pixels of the target image and the target related approximation pixel-values $p_s$ obtained as a result of $p_s = A_s'X$.

13. The method of claim 12, wherein, in operation (b2), assuming that a value $Xf_s$ is obtained for each of the pixels of the target image by multiplying the coordinate matrix X by the original pixel-values $f_s$, that a sum $\Sigma Xf_s$ of the values $Xf_s$ is a sensed concentrative moment $U_{sf}$ of the target image, that a coordinate-multiplication matrix obtained after the coordinate matrix X is multiplied by a transposed matrix X' is XX', and that an inverse matrix of the coordinate-multiplication coordinate XX' is $B^{-1}$, the unknown constants $A_s$ of the polynomial equation are calculated using $A_s = B^{-1}U_{sf}$.

14. The method of claim 13, wherein, in operation (c), assuming that a transposed matrix of a connection concentrative moment $U_{sp}$ of the target image is $U'_{sp}$ and that a connection concentrative moment of the target image is $U_{tp}$, the similarity $h_p$ is given by $$h_p = \frac{U'_{sp}B^{-1}U_{tp}}{\sqrt{U'_{sp}B^{-1}U_{sp}}}.$$

* * * * *